United States Patent
Rothman et al.

(10) Patent No.: US 9,291,490 B2
(45) Date of Patent: Mar. 22, 2016

(54) APPLICATIONS OF SONAR-BASED VF/GVF METERING TO INDUSTRIAL PROCESSING

(75) Inventors: Paul Joseph Rothman, Windsor, CT (US); Robert J. Maron, Middletown, CT (US); Christian Victor O'Keefe, Durham, CT (US)

(73) Assignee: CiDRA Corporate Services Inc., Wallingford, CT (US)

( * ) Notice: Subject to any disclaimer, the term of this patent is extended or adjusted under 35 U.S.C. 154(b) by 1124 days.

(21) Appl. No.: 12/991,636

(22) PCT Filed: May 11, 2009

(86) PCT No.: PCT/US2009/043438
§ 371 (c)(1),
(2), (4) Date: Feb. 1, 2011

(87) PCT Pub. No.: WO2009/137828
PCT Pub. Date: Nov. 12, 2009

(65) Prior Publication Data
US 2011/0160893 A1    Jun. 30, 2011

Related U.S. Application Data

(60) Provisional application No. 61/051,775, filed on May 9, 2008, provisional application No. 61/051,781, filed on May 9, 2008, provisional application No. 61/051,803, filed on May 9, 2008.

(51) Int. Cl.
*G06F 19/00*    (2011.01)
*G01S 15/00*    (2006.01)
*G01F 1/86*    (2006.01)
(Continued)

(52) U.S. Cl.
CPC ............... *G01F 1/86* (2013.01); *G01F 1/7082* (2013.01); *G01F 1/712* (2013.01); *G01F 1/74* (2013.01)

(58) Field of Classification Search
CPC ....................................... G01F 1/7082
USPC ........................................... 700/108
See application file for complete search history.

(56) References Cited

U.S. PATENT DOCUMENTS 3,379,421 A * 4/1968 Putman ........................ 366/17
4,726,896 A * 2/1988 Grove et al. ................. 209/166
(Continued)

OTHER PUBLICATIONS

O'Keefe et al. "If you can measure it, you can manage it." presented at "CMP 2007, Jan. 24, 2007".*
(Continued)

*Primary Examiner* — Mohammad Ali
*Assistant Examiner* — Yuhui R Pan (57) ABSTRACT

A processor module features a module that respond to input signalling containing information about a volumetric flow of a fluid having minerals and varying amounts of entrained gas flowing in a pipe and being processed in a processing stage of a mineral extraction processing system for extracting a mineral from ore, and provides output signalling containing information about operations of the processing stage of the mineral extraction processing system that is not substantially affected by the varying amounts of entrained gas in the fluid flowing in the pipe. The output signalling controls the operations of the processing stage. The input signalling is based upon a speed of sound measurement, including a SONAR-based entrained gas measurement to determine the amount of entrained air in conjunction with a density measurement of the fluid flowing in the pipe.

26 Claims, 9 Drawing Sheets

(51) Int. Cl.
    *G01F 1/708*     (2006.01)
    *G01F 1/712*     (2006.01)
    *G01F 1/74*     (2006.01)

(56) References Cited

U.S. PATENT DOCUMENTS

| | | | | |
|---|---|---|---|---|
| 4,830,741 | A * | 5/1989 | Ferencz et al. | 209/173 |
| 5,132,024 | A | 7/1992 | Hulbert | |
| 5,467,876 | A * | 11/1995 | Hicks et al. | 209/170 |
| 7,134,320 | B2 | 11/2006 | Gysling et al. | |
| 7,165,464 | B2 | 1/2007 | Gysling et al. | |
| 7,343,820 | B2 | 3/2008 | Gysling et al. | |
| 7,363,800 | B2 | 4/2008 | Gysling | |
| 7,367,240 | B2 | 5/2008 | Gysling et al. | |
| 2004/0182754 | A1 | 9/2004 | Lange | |
| 2004/0255695 | A1* | 12/2004 | Gysling et al. | 73/862 |
| 2005/0061060 | A1* | 3/2005 | Gysling et al. | 73/32 A |
| 2005/0103691 | A1 | 5/2005 | Hakola | |
| 2005/0150330 | A1* | 7/2005 | Rajic et al. | 75/722 |
| 2006/0219603 | A1 | 10/2006 | Bourke | |
| 2008/0130399 | A1* | 6/2008 | Littman et al. | 366/132 |
| 2008/0236298 | A1 | 10/2008 | Gysling | |

OTHER PUBLICATIONS 4 pages International Search Report PCT/US2009/043438 mailed Jul. 2, 2009.

Viega et al., "Application of Passive Sonar Technology to Long Standing Measurement Challenges in Industrial Processes." Datasheet [online]. Cidra Corporation, Nov. 4, 2007 [Retrieved on Oct. 5, 2010], Retrieved from the Internet: <URL:http://www.cidra.com/document_library/BI0291_ISA_Calgary_2007_Final04-11-07.pdf>. especially pp. 1, 4-6, 10, 12, 16, 20-22, 25.

O'Keefe et al., "Application of Non-Intrusive Sonar Array-Based Technology to Solve Unique and Difficult Measurement Situations." Datasheet [online]. Cidra Corporation, Nov. 14, 2007 [Retrieved on Oct. 5, 2010], Retrieved from the Internet: <URL:http://www.cidra.com/document_library/bi0327_cmp_2008_paper_final_14nov07.pdf, especially pp. 1,2,18.

O'Keefe et al.,\, "Description of Non-Intrusive Sonar Array-Based Technology and its Application to Unique and Difficult Slurry and Paste Flow Measurements." Datasheet [online]. Cidra Corporation, 2009 [Retrieved on Oct. 5, 2010]. Retrieved from the Internet:<URL:http://www.cidra.com/document_library/BI0339_Paste_2008_022508_final.pdf>.

\* cited by examiner

FIGURE 1a: Mineral Extraction Processing System – Prior Art

FIGURE 1b – Prior Art

FIGURE 1c: Grinding – Prior Art

FIGURE 2: Grinding Stage

FIGURE 3a: Flotation Stage

FIGURE 3c

FIGURE 4: Post-Flotation Stage

FIGURE 4a

APPLICATIONS OF SONAR-BASED VF/GVF METERING TO INDUSTRIAL PROCESSING

CROSS-REFERENCE TO RELATED APPLICATIONS

This application corresponds to international patent application Ser. No. PCT/2009/043438, filed 11 May 2009, which claims benefit to provisional patent application Ser Nos. 61/051,775; 61/051,781; and 61/051,803, all filed May 9, 2008, which are all incorporated by reference in their entirety.

BACKGROUND OF THE INVENTION

1. Field of Invention

This invention relates to a technique for using SONAR-based volumetric flow/gas volume fraction (VF/GVF) metering to industrial processing; and more particularly, this invention also relates to using SONAR-based VF/GVF metering in a mineral extraction processing system, including extracting a mineral from ore.

2. Description of Related Art

Figure 1A:
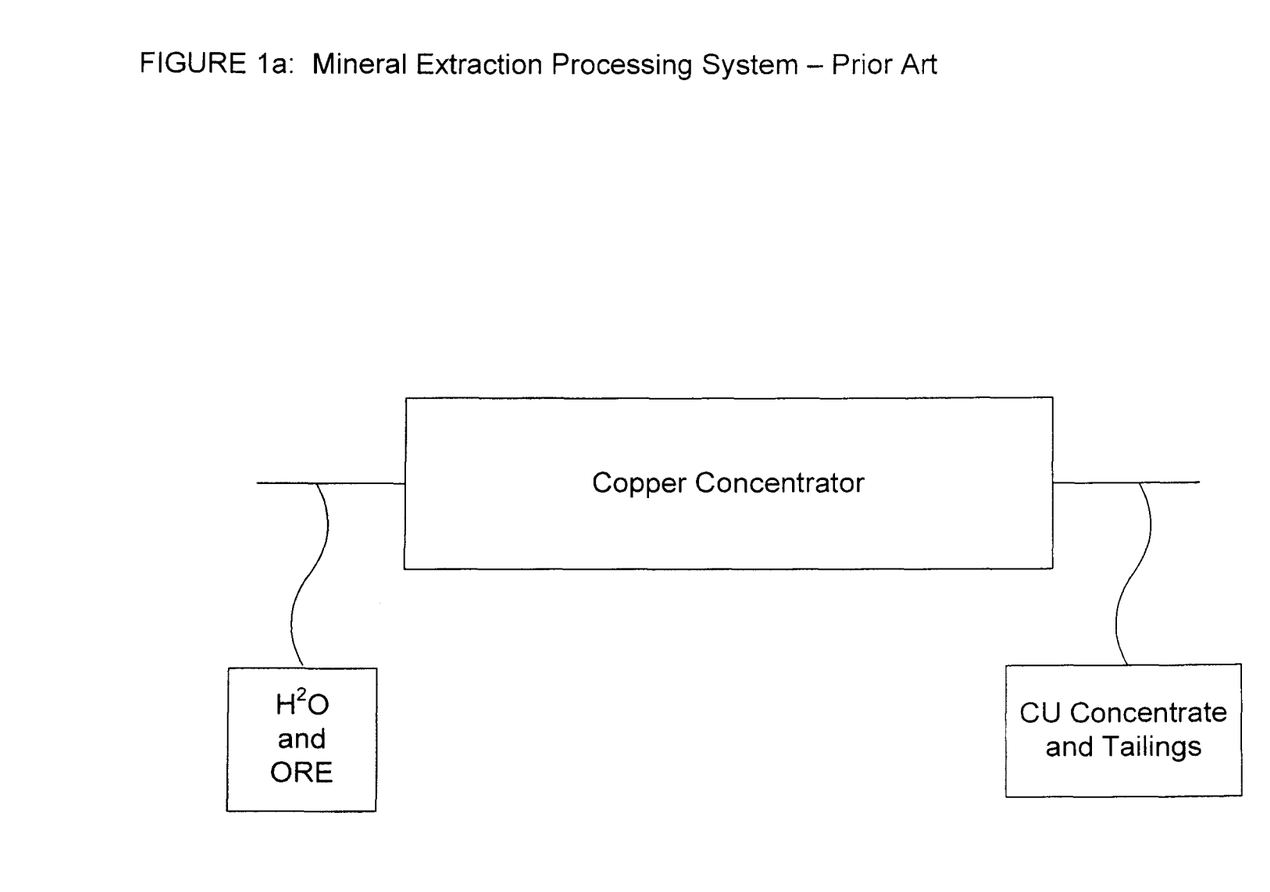
FIG. 1a is a block diagram of a mineral extraction processing system in the form of a copper concentrator that is known in the art.
Figure 1B:
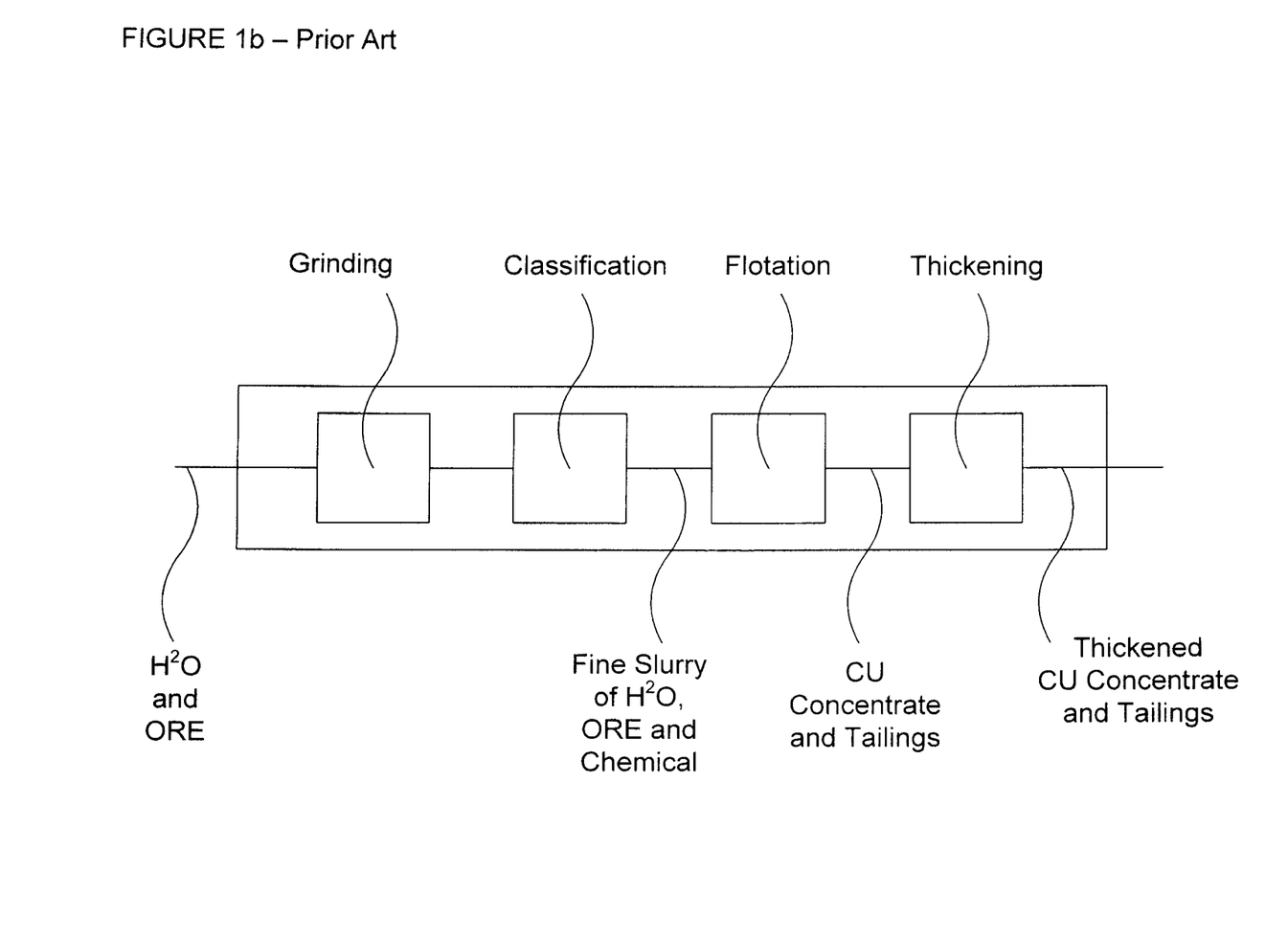
FIG. 1b is a block diagram showing typical processing stages of a mineral extraction processing system that is known in the art.

In many industrial processes the sorting, or classification, of product by size is critical to overall process performance. A minerals processing plant, or beneficiation plant, is no exception. In the case of a copper concentrator as shown in FIG. 1a, the input to the plant is water and ore (of a particular type and size distribution) and the outputs are copper concentrate and tailings. The process consists of a grinding, classification, floatation, and thickening, as shown in FIG. 1b. The grinding and classification stage produces a fine slurry of water and ore, to which chemicals are added prior to being sent to the flotation stage. Once in the flotation stage, air is used to float the copper mineral while the gange (tailings) is depressed. The recovered copper is cleaned and dried. The tailings are thickened and sent to the tailings pond. The classification stage is critical to the performance of two areas of the process. These areas are the grinding throughput and flotation recovery, grade and throughput.

Grinding Operation

Figure 1C:
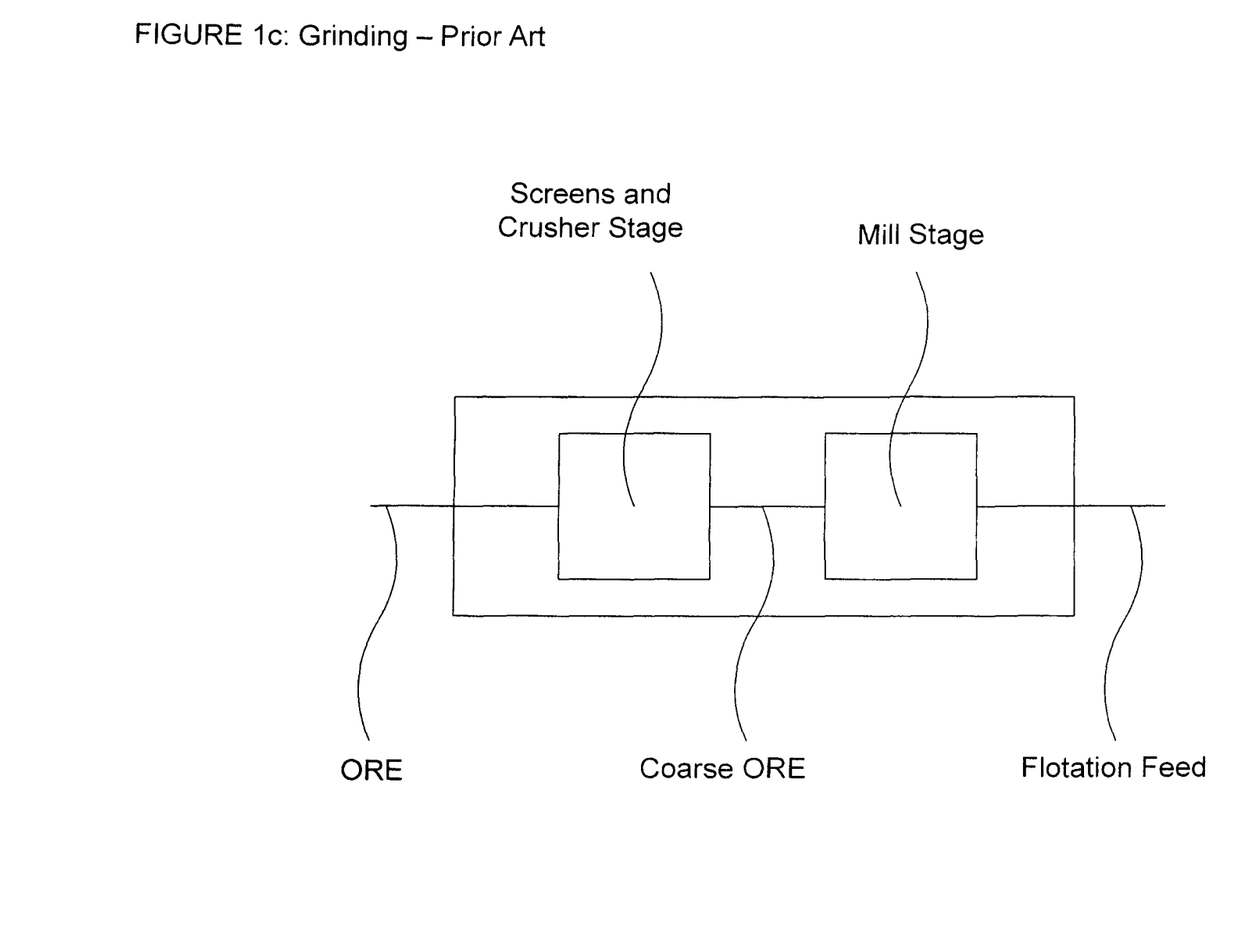
FIG. 1c is a block diagram showing a processing stage of a mineral extraction processing system in the form of a grinding stage that is known in the art.

A grinding operation may include a screens and crusher stage and a mill stage shown in FIG. 1c, that is typically configured mills in closed circuit with a hydrocyclone battery. A hydrocyclone is a mechanical device that will separate a slurry stream whereby the smaller particles will exit out the overflow line and the larger particles will exit out the underflow line. The overflow is sent to the flotation circuit and the underflow is sent back to the mill for further grinding. A collection of these devices is called a battery. A hydrocyclone will be sized based on the particular process requirements. The performance of the hydrocyclone is dependent on how well it is matched to the process conditions. Once the proper hydrocyclone has been chosen and installed, it must be operated within a specific range in order to maintain the proper split between the overflow and the underflow. The split is dependent on slurry feed density and volumetric flow into the device. A typical control system will use a combination of volumetric flow, feed density and pressure across the hydrocyclone to control the split. Because of the harsh environmental and process conditions all of these measurements suffer from maintenance and performance issues. This can result in reduced classification performance and reduced mill throughput. Flotation performance is highly dependent on the particle size distribution in the feed which comes from the battery overflow, thus it is dependent on the hydrocyclone classification performance. The mill throughput is highly dependent on the circulation load which comes from the battery underflow.

The process conditions are challenging because the slurry is made up of high solids content slurry which contains varying amounts of entrained air. The air is entrained by the pumping action needed to transport the slurry throughput the process. In the case of the feed to a hydrocyclone battery the slurry is collected in a sump before it is pumped to the battery. Often the sump levels drop below the desired level and air is pulled into the stream. Once the air is in the stream it is difficult to get out because the slurry is made up of a high solids content of small particles.

Making an accurate and repeatable volumetric flow and density measurement of a slurry, which has a varying amount of entrained air, is a challenging endeavored. The traditional in-line volumetric flow meter may display erratic readings in the presence of entrained air. It may also report a volumetric flow reading that is in error. The error will be a function of the amount of entrained air in the process. The same can be said for a density meter. The density meter will report the average density of the slurry air mixture as it passes by a sensor. What is desired is the density of the slurry alone. Therefore this reported density reading will typically have an error which will be a function of the amount of entrained air in the process.

The traditional or known means of measuring volumetric flow and density have been subject to errors due to the presence of air in the process. This has proven to make it difficult to control the split from the hydrocyclone battery which can impact the performance of both the milling and flotation circuits.

In view of the aforementioned, there is a long felt need in the industry to be able to correct errors in the density measurement due to the entrained air in such industrial processes, and to provide a more accurate and repeatable hydrocyclone split based on the same.

Minerals Separation Process and Reagent Addition

In many industrial processes, a flotation process is used to concentrate and clean the final product. The performance of the flotation process or stage is dependent on many parameters. One of those is the floatability of the ore. The floatability is highly dependent on the type and dose of chemical reagent that is used to make the particles hydrophobic. The chemical dosing rate is typically defined in units of grams of chemical per ton of ore processed. In some cases more chemical is added than is necessary in order to make sure that enough is being used. These chemicals are very expensive and make up a sizable portion of a minerals processing plant's operational expenses.

In a typical plant, operators will determine the ore tonnage rate by using a weigh scale on the input ore feed to the first stage of grind. Then the reagent is added according to the prescribed dosing rate. A more direct means of dosing the reagent would be to measure the actual mass flow of ore entering the flotation circuit. The reagent would be added based on this measurement not the weigh scale.

In view of the aforementioned, there is a long felt need in the industry to be able to correct errors in the density measurement due to the entrained air in such industrial processes, and to dose the reagent more accurately.

Final Product Accounting in an Industrial Process

In many minerals processing plants, or beneficiation plants, the ore is ground and concentrated to produce a product called final concentrate. In the case of the copper concentrator, the input to the plant is water and ore (of a particular type and size distribution) and the outputs are copper concentrate and tailings. The process consists of a grinding, classification, floatation, and thickening. The grinding and classification stage produces fine slurry of water, ore, and chemicals which is then sent to the flotation stage. Once in the flotation stage air is used to float the copper mineral while the gange (tailings) is depressed. The recovered copper is cleaned and dried and is known as the final concentrate. The tailings are thickened and sent to the tailings pond.

Measuring the amount of concentrate, while in the slurry form, is a difficult task. The slurry is made up of high solids content. The solids are made up of small particles of high specific gravity. The combination of this type of slurry being transported via pumping systems and the injection of air at the flotation stage makes this slurry become aerated. The slurry has varying amounts of entrained gas/air throughout the process.

This is an important measurement because in many cases it is the final accounting metric for the processing plant. In many plants, the concentrate may be dried and weighed. Alternatively, in some cases instruments such as volumetric flow meters, density meters, and stream analyzers are used to make these measurements. In an ideal environment these instruments will provide accurate and repeatable data. Unfortunately, many industrial processes require these instruments to operate in very harsh environments. This includes both extreme physical environmental conditions as well as challenging process conditions. Because of these practical realities the accuracy and repeatability of these instruments is often called into question. Therefore the final product accounting is called into question.

In view of the aforementioned, there is a long felt need in the industry to be able to correct errors in the density measurement due to the entrained air in such industrial processes, and to provide a more accurate and repeatable final accounting.

SUMMARY OF THE INVENTION

The Application of SONAR to a Classification Process to Improve Performance

The two critical measurements needed to control the hydrocyclone battery are volumetric flow and density. Therefore, in the prior art a traditional flow meter and density meter were placed on the feedline to the hydrocyclone battery. Because of the limitations of traditional flow meters, pressure sensors are also often used as an indication of volumetric flow. By replacing the traditional flow meter (or pressure sensor) with a SONAR-based volumetric flow/gas volume fraction (VF/GVF) meter according to the present invention, a more accurate and repeatable measurement of volumetric flow may be achieved. The SONAR-based meter is not affected by the entrained air. In fact, the SONAR-based meter can measure the amount of entrained air. This will then be used to correct the errors in the density measurement due to the entrained air in the process. As a result a more accurate and repeatable hydrocyclone split may be achieved according to the present invention.

The Application of SONAR to a Minerals Separation Process to Optimize Reagent Addition In order to make a direct measurement of the mass flow of the ore entering the flotation circuit according to the present invention, a SONAR-based volumetric flow/gas volume fraction (VF/GVF) meter and a density meter is placed in the input line according to the present invention. The reagent may then be dosed based on the exact measured mass flow rate according to the present invention. The density meter may include a nuclear density gauge.

The Application of SONAR to an Industrial Process to Improve Final Product Accounting The two critical measurements for final product accounting are volumetric flow and density. Therefore, in the prior art the traditional flow meter and density meter are typically placed at the end of the process. By replacing the traditional flow meter with a SONAR-based VF/GVF meter according to the present invention, a more accurate and repeatable measurement of volumetric flow may be achieved. The SONAR-based meter is not affected by the entrained air. In fact, the SONAR meter can measure the amount of entrained air. This will then be used to correct the errors in the density measurement due to the entrained air in the process. As a result a more accurate and repeatable final accounting may be achieved according to the present invention.

The Signal Processor Module

In its broadest sense, the present invention provides a new and unique method and apparatus that may be used in each of the aforementioned applications. According to some embodiments of the present invention, the apparatus may take the form of a processor module that features one or more modules configured to respond to one or more input signals containing information about a volumetric flow of a fluid having minerals and varying amounts of entrained gas flowing in a pipe and being processed in a processing stage of a mineral extraction processing system for extracting a mineral from ore, and also configured to provide one or more output signals containing information about operations of the processing stage of the mineral extraction processing system that is not substantially affected by the varying amounts of entrained gas in the fluid flowing in the pipe.

According to some embodiments of the present invention, the one or more output signals may be used to control the operations of the processing stage.

According to some embodiments of the present invention, the one or more input signals may be based at least partly on a speed of sound measurement, including a SONAR-based entrained gas measurement to determine the amount of entrained air in conjunction with a density measurement of the fluid flowing in the pipe.

According to some embodiments of the present invention, the one or more input signals may be received from a SONAR-based volumetric flow/gas volume fraction meter placed on a feed line pipe providing the fluid to the processing stage.

According to some embodiments of the present invention, the one or more input signals may be received from a SONAR-based volumetric flow/gas volume fraction meter placed on an output line pipe receiving the fluid from the processing stage.

According to some embodiments of the present invention, the one or more input signals may also be based at least partly on a gas volume measurement that depends on acoustic pressures sensed in the fluid flowing in the pipe.

According to some embodiments of the present invention, the one or more output signals may depend on an error correction based at least partly on the amount of entrained air in the fluid.

According to some embodiments of the present invention, the error correction may correct errors in a density measurement of the fluid.

According to some embodiments of the present invention, the fluid may take the form of a slurry made up of high solids which contain varying amounts of entrained air.

According to some embodiments of the present invention, the processing stage may form part of a mineral concentrator that is either now known or later developed in the future, as well as other mineral extractions processing systems either now known or later developed in the future.

According to some embodiments of the present invention, the method may take the form of steps for responding with one or more modules to one or more input signals containing information about a volumetric flow of a fluid having minerals and varying amounts of entrained gas flowing in a pipe and being processed in a processing stage of a mineral extraction processing system for extracting a mineral from ore; and providing with one or more modules one or more output signals containing information about operations of the processing stage of the mineral extraction processing system that is not substantially affected by the varying amounts of entrained gas in the fluid flowing in the pipe.

According to some embodiments of the present invention, the apparatus may also take the form of a computer-readable storage medium having computer-executable components for performing the steps of the aforementioned method.

BRIEF DESCRIPTION OF THE DRAWING

The drawing includes FIGS. 1-4, which are not drawn to scale, as follows.

DETAILED DESCRIPTION OF BEST MODE OF THE INVENTION

Figure 2:
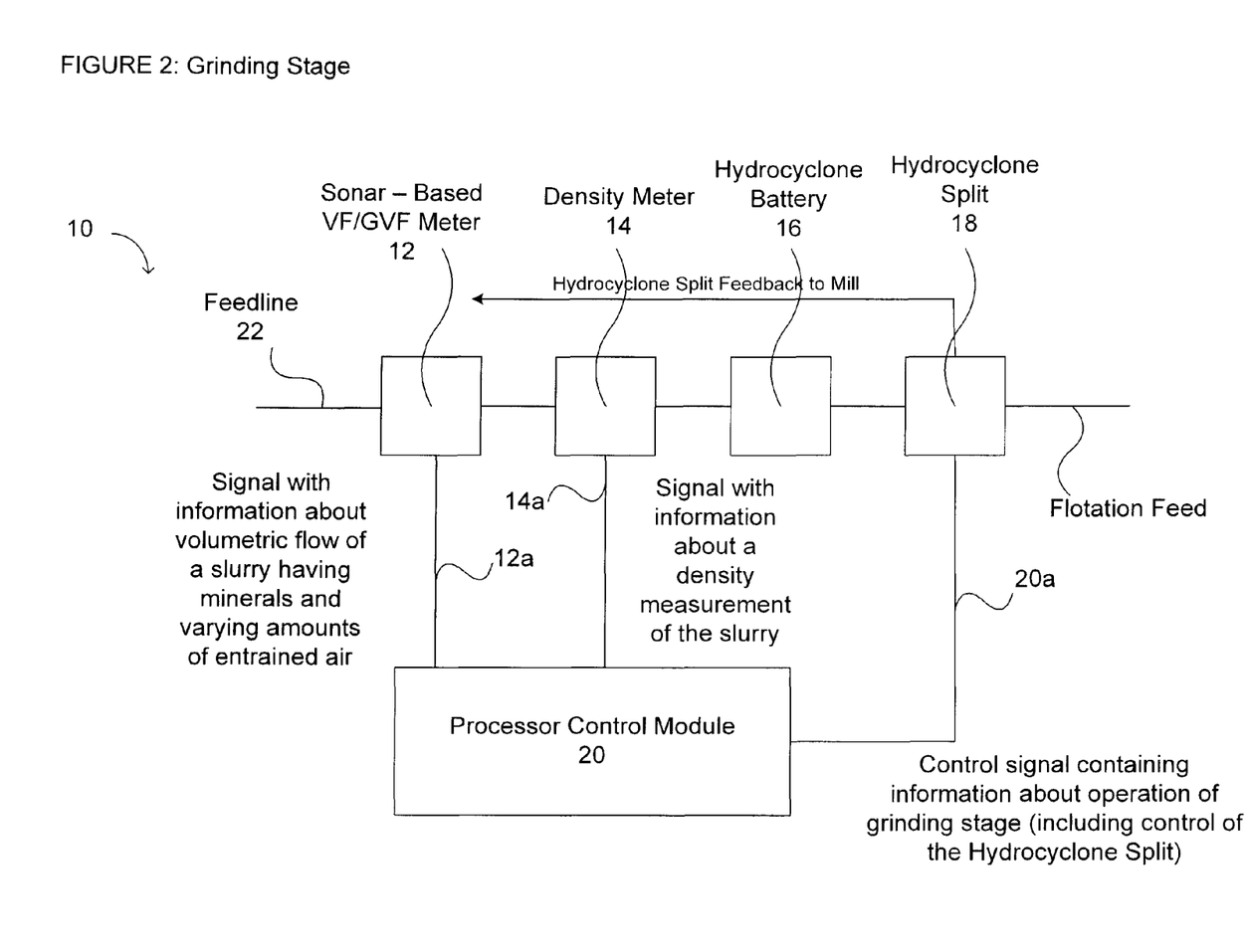
FIG. 2 is a block diagram showing a grinding stage according to some embodiment of the present invention.

FIG. 2 The Grinding Stage

FIG. 2 shows a grinding stage generally indicated as 10 that forms part of a mineral extraction processing system for extracting minerals from ore. The present invention as it relates to the grinding stage 10 is described in relation to the mineral extraction processing system taking the form of a copper concentrator, although the scope of the invention is not intended to be limited to any particular type or kind of mineral process or mineral extraction processing system either now known or later developed in the future.

The grinding stage 10 includes a SONAR-based volumetric flow/gas volume fraction (VF/GVF) meter 12, a density meter 14, a hydrocyclone or hydrocyclone battery 16, a hydrocyclone split 18 and a processor module (also known as a processor control module) 20.

The SONAR-based VF/GVF meter 12 is placed on a feedline pipe 22 in relation to the hydrocyclone battery 16. The feedline pipe 22 provides a slurry having minerals and varying amounts of entrained air to the grinding stage 10. The SONAR-based VF/GVF meter 12 is configured to sense the volumetric flow of the slurry and provide a signal along line 12a containing information about the volumetric flow that is not substantially affected by the varying amounts of entrained air in the slurry. The SONAR-based VF/GVF meter 12 is known in the art and may take the form of a SONAR-based VF/GVF-100 meter, and is disclosed by way of example in whole or in part in U.S. Pat. Nos. 7,165,464; 7,134,320; 7,363,800; 7,367,240; and 7,343,820, all of which are incorporated by reference in their entirety. The scope of the invention is also intended to include other types or kinds of SONAR-based VF/GVF meters either now known or later developed in the future that perform the same basic functionality of the SONAR-based VF/GVF meter 12 as such functionality relates to implementing the present invention.

The processor module 20 is configured to respond to the signal along line 12a from the SONAR-based VF/GVF meter 12, and also configured to provide an output signal along line 20a containing information to control the hydrocyclone split 18 that provides a flotation feed from the hydrocyclone battery 16. As shown, the hydrocyclone split 18 provides the flotation feed to the next stage in the mineral extraction processing system (see FIG. 1b by way of example), and provides a hydrocyclone split feedback to the feedline pipe 22. In addition to controlling the split, the signal on line 20a can also be used to control other parameters either now known or later developed in the future, such as pump speed or the addition of dilution water. The scope of the invention is not intended to be limited to the type or kind of parameter, or the manner in which the parameter is being controlled.

The density meter 14 is placed on the feed line pipe in relation to the SONAR-based VF/GVF meter and is configured to provide a signal along line 14a containing information about a density measurement of the slurry to the processor module 20. The density meter 14 is known in the art, and disclosed by way of example in whole or in part in U.S. Pat. Nos. 7,165,464; 7,134,320; 7,363,800; 7,367,240; and 7,343,820. The scope of the invention is also intended to include other types or kinds of meters like meter 14 either now known or later developed in the future that perform the same basic functionality of the meter 14 as such functionality relates to implementing the present invention. In operation, the SONAR-based VF/GVF meter 12 is configured to measure the amount of entrained air which may be used by the processor module 20 to correct errors in the density measurement of the fluid, according to some embodiments of the present invention. For example, the processor module 20 may use the errors in the density measurement of the fluid to determine and provide the output signal along line 20a containing information to control the hydrocyclone split 18 according to the present invention. By way of example, and consistent with that discuss above, the technique for making this measurement and correction is disclosed in whole or in part in U.S. Pat. Nos. 7,165,464; 7,134,320; 7,363,800; 7,367,240; and 7,343,820. Moreover, by way of example, the present invention is disclosed with the meter 12 being arranged in front of the density meter 14, although the scope of the invention is not intended to be limited to any particular arrangement of the meters.

The functionality of the processor module 20 may be implemented using hardware, software, firmware, or a combination thereof. In a typical software implementation, the processor modules would include one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology either now known or later developed in the future.

The hydrocyclone battery 16 and the hydrocyclone split 18 are known in the art, and the scope of the invention is not intended to be limited to any particular type or kind thereof either now known or later developed in the future. As shown in FIG. 2, the feedback line from the hydrocyclone split 18 is shown going back to the mill stage (see FIG. 1c) so the larger size particles can be re-ground. However, the scope of the invention is not intended to be limited to where this feedback is fed back to or processed.

The grinding stage 10 may also include one or more elements, devices, apparatus or equipment that are known in the art, do not form part of the underlying invention, and are not disclosed herein or described in detail for that reason.

The scope of the invention re grinding stage and/or hydrocyclone applications is not intended to be limited to the type or kind of mineral being processed, or the type of mineral process, either now known or later developed in the future. By way of example, the scope of the invention is intended to include hydrocyclone applications include Molybdenum, Lead, Zinc, Iron, Gold, Silver, Nickel, Fluorite, Tantalum, Tungsten, Tin, Lithium, Coal, as well as, e.g. diamonds, etc.

Figure 3A:
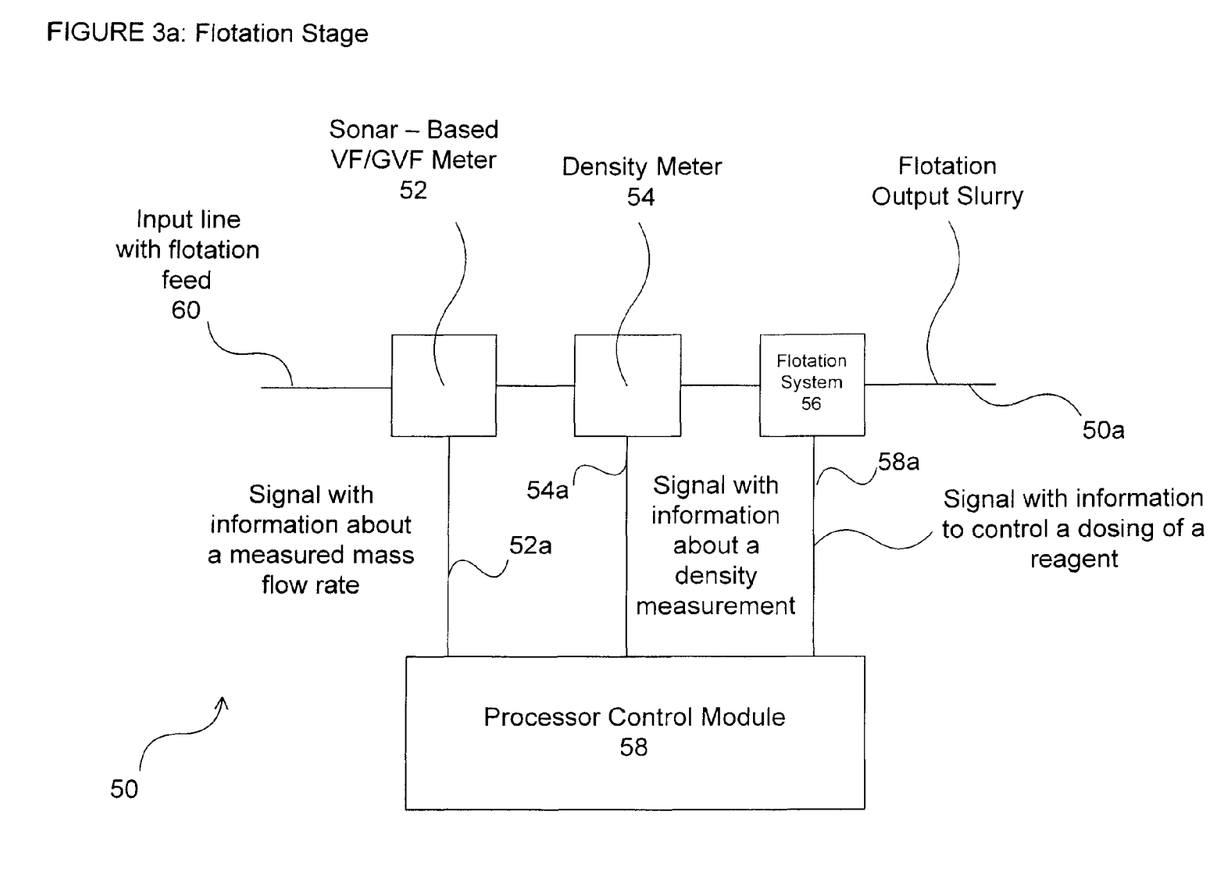
FIGS. 3a-3c are block diagrams showing a flotation stage according to some embodiment of the present invention.
Figure 3B:
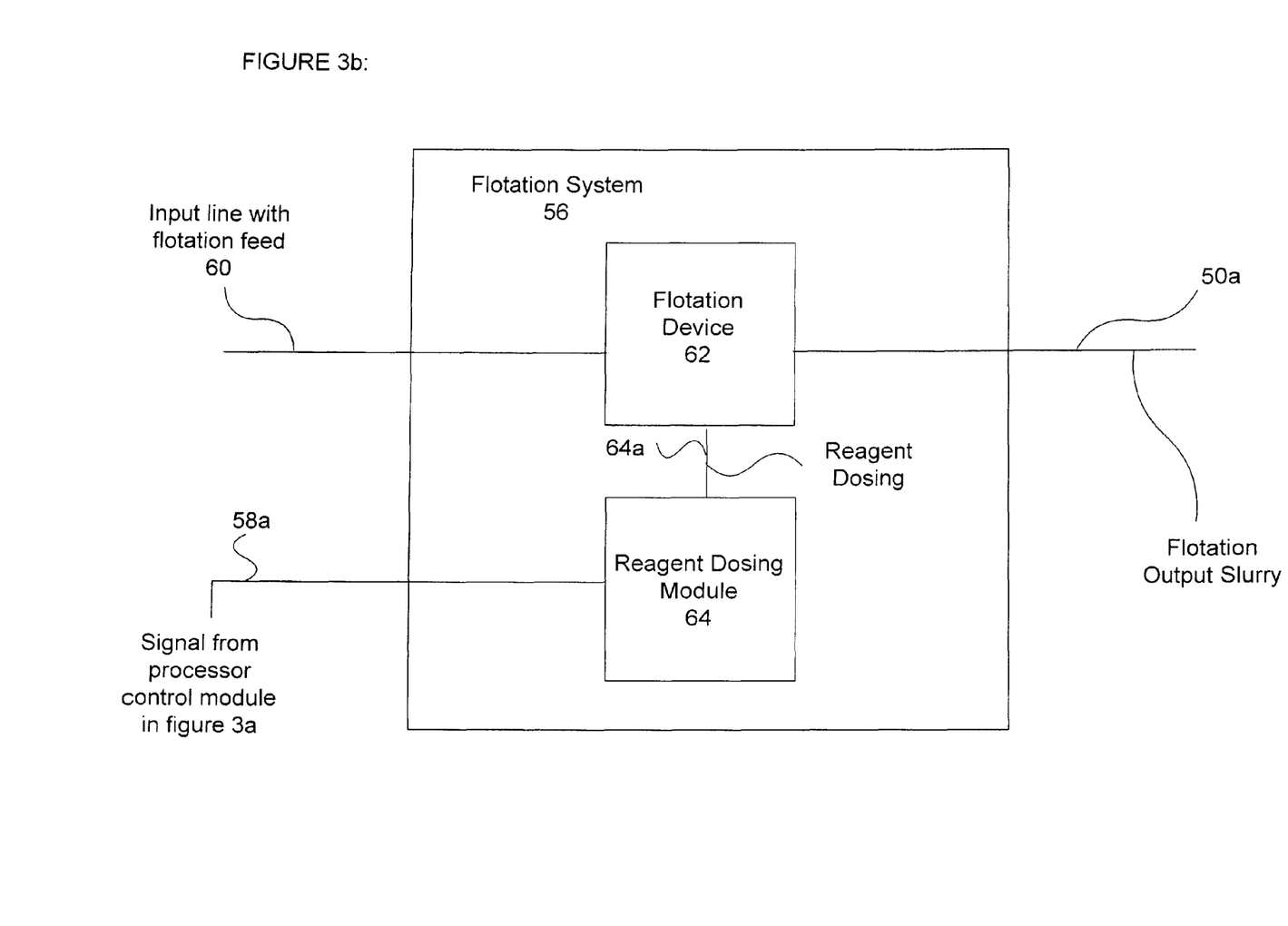
Figure 3C:
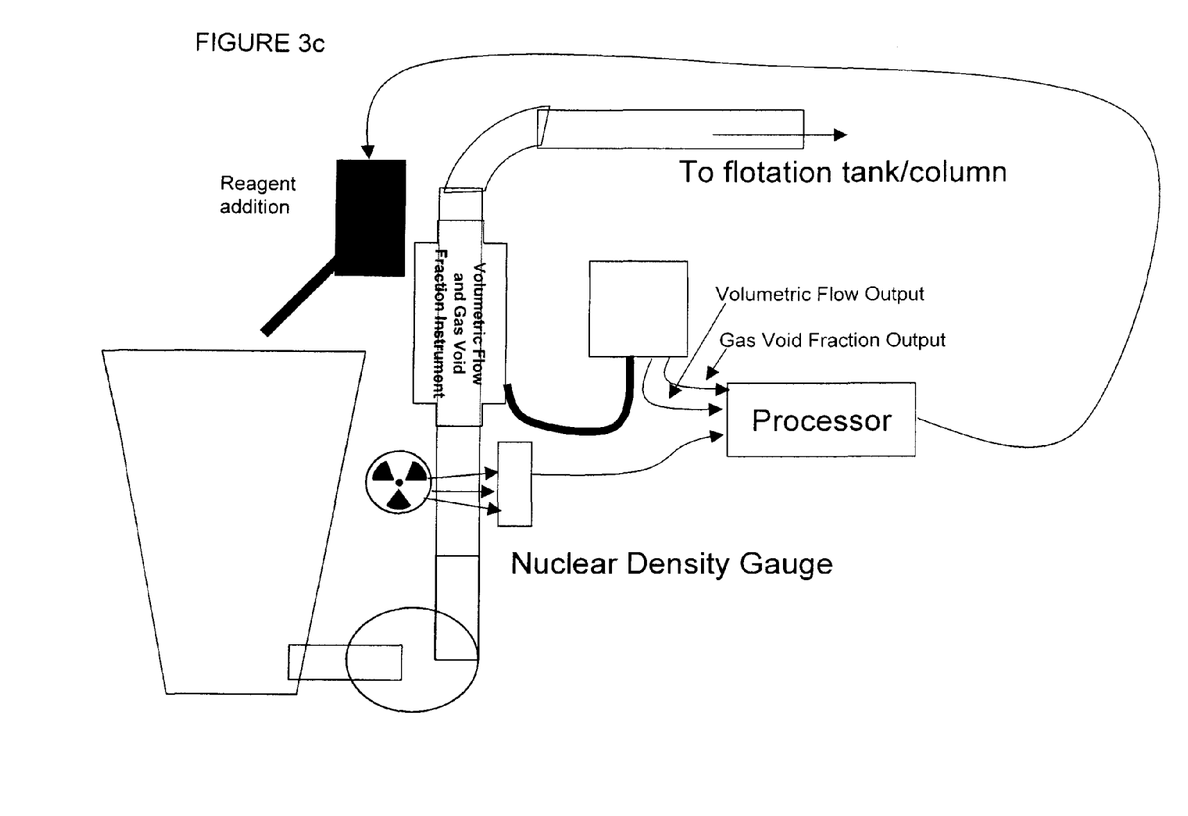

FIGS. 3a-3c: The Flotation Stage

FIG. 3a shows a flotation stage generally indicated as 50 that forms part of a mineral extraction processing system for extracting minerals from ore. The present invention as it relates to the flotation stage 50 is described in relation to the mineral extraction processing system taking the form of a copper concentrator, although the scope of the invention is not intended to be limited to any particular type or kind of mineral extraction processing system either now known or later developed in the future.

The flotation stage 50 includes a SONAR-based volumetric flow/gas volume fraction (VF/GVF) meter 52, a density meter 54, a flotation system 56 and a processor module (also known as a processor control module) 58.

The SONAR-based VF/GVF meter 52 is placed on a feedline pipe 60 in relation to the flotation system 56. The feedline pipe 60 provides a slurry having minerals and varying amounts of entrained air to the flotation stage 50. The SONAR-based VF/GVF meter 52 is configured to sense the volumetric flow of the slurry and provide a signal along line 52a containing information about the volumetric flow that is not substantially affected by the varying amounts of entrained air in the slurry. According to some embodiments of the present invention, the SONAR-based VF/GVF meter 52 is configured to make a direct measurement of a mass flow of ore entering the flotation stage 50. The SONAR-based VF/GVF meter 52 is known in the art, and disclosed by way of example in whole or in part in the aforementioned U.S. Pat. Nos. 7,165,464; 7,134,320; 7,363,800; 7,367,240; and 7,343,820. Consistent with that described above, the scope of the invention is also intended to include other types or kinds of SONAR-based VF/GVF meters either now known or later developed in the future that perform the same basic functionality of the SONAR-based VF/GVF meter 52 as such functionality relates to implementing the present invention.

The processor module 58 is configured to respond to the signal along line 52a from the SONAR-based VF/GVF meter 52, and also configured to provide an output signal along line 58a containing information to control a dosing of a reagent that is provided to the slurry in the flotation stage 50. In addition, the processor control module 58 could also provide a control signal to control feed rate and/or density, as well as to control other parameters either now known or later developed in the future. Consistent with that described above, the scope of the invention is not intended to be limited to the type or kind of parameter, or the manner in which the parameter is being controlled. According to some embodiments of the present invention, the reagent may be dosed based on a measured mass flow rate of the ore entering the flotation stage 50 by the SONAR-based VF/GVF meter 52. As shown, the flotation system 56 provides a flotation output slurry to the next stage in the mineral extraction processing system (see FIG. 1b by way of example).

The density meter 54 is placed on the feed line pipe in relation to the SONAR-based VF/GVF meter 52 and is configured to provide a signal along line 54a containing information about a density measurement of the slurry to the processor module 20. Consistent with that described above, the density meter 54 is known in the art, and disclosed by way of example in whole or in part in U.S. Pat. Nos. 7,165,464; 7,134,320; 7,363,800; 7,367,240; and 7,343,820. The scope of the invention is also intended to include other types or kinds of meters like meter 54 either now known or later developed in the future that perform the same basic functionality of the meter 54 as such functionality relates to implementing the present invention. In operation, the SONAR-based VF/GVF meter 52 is configured to measure the amount of entrained air which may be used by the processor module 58 to correct errors in the density measurement of the fluid, according to some embodiments of the present invention. For example, the processor module 58 may use the errors in the density measurement of the fluid to determine and provide the output signal along line 58a containing information to control the dosing of the reagent that is provided to the slurry in the flotation stage 50, according to the present invention. By way of example, and consistent with that discuss above, the technique for making this measurement and correction is disclosed in whole or in part in U.S. Pat. Nos. 7,165,464; 7,134, 320; 7,363,800; 7,367,240; and 7,343,820. Moreover, by way of example, the present invention is disclosed with the meter 52 being arranged in front of the density meter 54, although the scope of the invention is not intended to be limited to any particular arrangement of the meters.

The functionality of the processor module 58 may be implemented using hardware, software, firmware, or a combination thereof. In a typical software implementation, the processor modules would include one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology either now known or later developed in the future.

By way of example, the flotation system 56 is shown in FIG. 3b as having a flotation device 62 and a reagent dosing module 64 for providing the reagent dosing along line 64a in response to the signal along line 58a (see FIG. 3a) from the processor module 58. The flotation device 62 receives the flotation feed along the input line 60 and the reagent dosing along line 64a, and provides a flotation output slurry based on the same. Such a flotation system like element 56, including such a flotation device 62 and such a reagent dosing module 64, is known in the art, and the scope of the invention is not intended to be limited to any particular type or kind thereof either now known or later developed in the future.

The flotation stage 50 and flotation system 56 may also include one or more elements, devices, apparatus or equipment that are known in the art, do not form part of the underlying invention, and are not disclosed herein or described in detail for that reason.

FIG. 3c shows an alternative embodiment of a flotation stage that forms part of a mineral extraction processing system for extracting minerals from ore, where the density meter takes the form of a nuclear density gauge that measure the nuclear density and provides a signal containing information about a nuclear density measurement. Nuclear density gauges are known in the art and the scope of the invention is not intended to be limited to any particular type or kind thereof.

The scope of the invention re flotation stage applications is not intended to be limited to the type or kind of mineral being processed, or the type of mineral process, either now known or later developed in the future. By way of example, the scope of the invention is intended to include flotation stage applications including (but not limited to): Molybdenum, Lead, Zinc, Iron, Gold, Silver, Nickel, Fluorite, Tantalum, Tungsten, Tin, Lithium, Coal.

Figure 4:
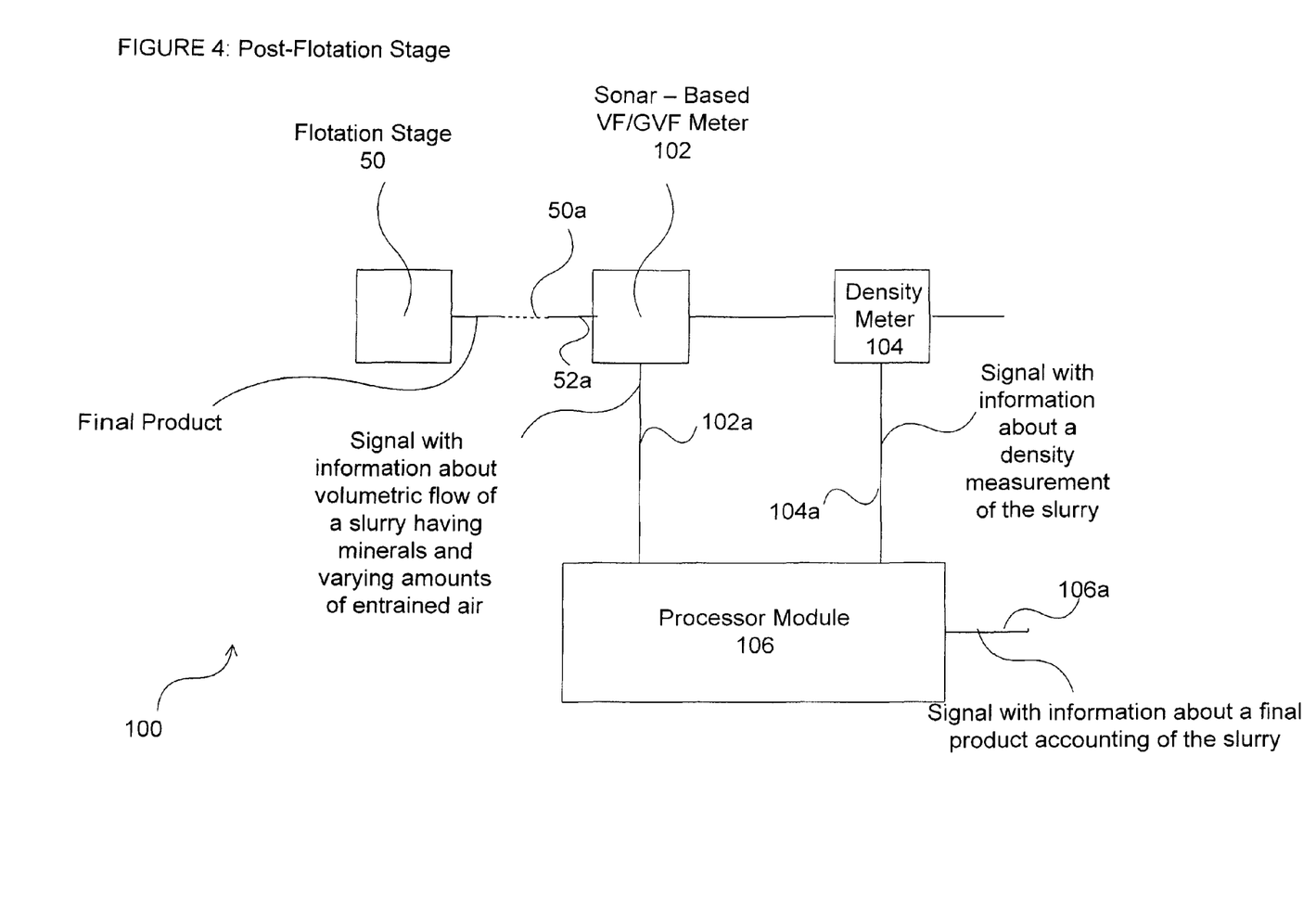
FIGS. 4 and 4a are block diagrams showing a post-flotation stage according to some embodiment of the present invention.
Figure 4A:
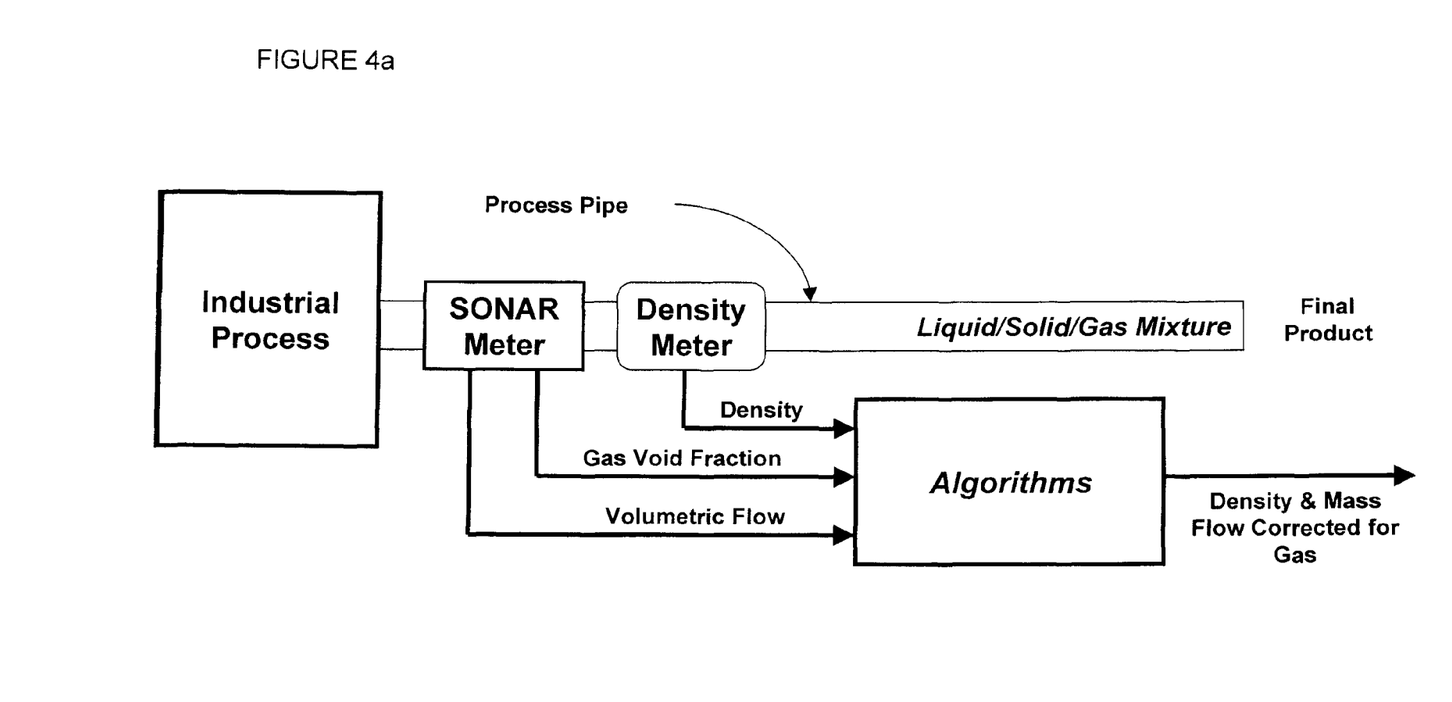

FIGS. 4 and 4a: Post-Flotation Stage 100

FIG. 4 shows a post-flotation stage generally indicated as 100 that forms part of a mineral extraction processing system for extracting minerals from ore. The present invention as it relates to the post-flotation stage 100 is described in relation to the mineral extraction processing system taking the form of a copper concentrator, although the scope of the invention is not intended to be limited to any particular type or kind of mineral extraction processing system either now known or later developed in the future. The post-flotation stage 100 is described in relation to the flotation stage 50 (FIG. 3) that provides the flotation output slurry in the form of a final product along line 50a, although the scope of the invention is intended to include the post-flotation stage 100 being post some other stage in the mineral extraction processing system either now known or later developed in the future.

The post-flotation stage 100 includes a SONAR-based volumetric flow/gas volume fraction (VF/GVF) meter 102, a density meter 104 and a processor module 106.

The SONAR-based VF/GVF meter 102 is placed on the line pipe 50a at the end of the mineral extraction processing system in relation to the flotation stage 50. The line pipe 50a provides a slurry having minerals and varying amounts of entrained air from the flotation stage 50. The SONAR-based VF/GVF meter 102 is configured to sense the volumetric flow of the slurry and provide a signal along line 102a containing information about the volumetric flow that is not substantially affected by the varying amounts of entrained air in the slurry. The SONAR-based VF/GVF meter 102 is known in the art, and disclosed by way of example in whole or in part in the aforementioned U.S. Pat. Nos. 7,165,464; 7,134,320; 7,363,800; 7,367,240; and 7,343,820. Consistent with that described above, the scope of the invention is also intended to include other types or kinds of SONAR-based VF/GVF meters either now known or later developed in the future that perform the same basic functionality of the SONAR-based VF/GVF meter 102 as such functionality relates to implementing the present invention.

The processor module 106 is configured to respond to the signal along line 102a from the SONAR-based VF/GVF meter 102, and also configured to provide an output signal along line 106a containing information about a final product accounting of the slurry in the post-flotation stage 100.

The density meter 104 is placed on the feed line pipe in relation to the SONAR-based VF/GVF meter 102 and is configured to provide a signal along line 104a containing information about a density measurement of the slurry to the processor module 106. Consistent with that described above, the density meter 104 is known in the art, and disclosed by way of example in whole or in part in U.S. Pat. Nos. 7,165, 464; 7,134,320; 7,363,800; 7,367,240; and 7,343,820. The scope of the invention is also intended to include other types or kinds of meters like meter 104 either now known or later developed in the future that perform the same basic functionality of the meter 104 as such functionality relates to implementing the present invention. In operation, the SONAR-based VF/GVF meter 102 is configured to measure the amount of entrained air which may be used by the processor module 106 to correct errors in the density measurement of the fluid, according to some embodiments of the present invention. For example, the processor module 106 may use the errors in the density measurement of the fluid to determine and provide the output signal along line 106a containing information about a final product accounting of the slurry in the stage, according to the present invention. By way of example, and consistent with that discuss above, the technique for making this measurement and correction is disclosed in whole or in part in U.S. Pat. Nos. 7,165,464; 7,134, 320; 7,363,800; 7,367,240; and 7,343,820. Moreover, by way of example, the present invention is disclosed with the meter 102 being arranged in front of the density meter 104, although the scope of the invention is not intended to be limited to any particular arrangement of the meters.

The functionality of the processor module 106 may be implemented using hardware, software, firmware, or a combination thereof. In a typical software implementation, the processor modules would include one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology either now known or later developed in the future.

The post-flotation stage 100 may also include one or more elements, devices, apparatus or equipment that are known in the art, do not form part of the underlying invention, and are not disclosed herein or described in detail for that reason.

FIG. 4a shows a generalized diagram of the application of SONAR to an industrial process to improve final product accounting, including a sonar meter and a density meter that provide signalling containing information about density, gas void fraction and volumetric flow and an algorithm that forms part of a processing module that receives the signalling and provides corresponding signalling containing information about density and mass flow corrected gas. The industrial process may include those either now known or later developed in the future, including any mineral process, as well as mineral extraction processing systems.

The scope of the invention re post-stage applications is not intended to be limited to the type or kind of mineral being processed, or the type of mineral process, either now known or later developed in the future. By way of example, the scope of the invention is intended to include final accounting applications for all metals and minerals, including (but not limited to): Molybdenum, Lead, Zinc, Iron, Gold, Silver, Nickel, Fluorite, Tantalum, Tungsten, Tin, Lithium, Coal, or Diamond.

Density Correction Techniques

The scope of the invention is intended to include applications in relation to density correction techniques either now known or later developed in the future, including techniques for compensating using a nuclear density gauge or meter consistent with that described above.

Applications Re Other Industrial Processes

By way of example, the present invention is described in relation to, and part of, a mineral extraction processing system for extracting minerals from ore. However, the scope of the invention is intended to include other types or kinds of industrial processes either now known or later developed in the future, including any mineral process, such as those related to processing substances or compounds that result from inorganic processes of nature and/or that are mined from the ground, as well as including either other extraction processing systems or other industrial processes, where the sorting, or classification, of product by size is critical to overall industrial process performance.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. Apparatus comprising:
   a signal processor module configured to
   receive first signals from a SONAR-based volumetric flow/gas volume fraction (VF/GVF) meter containing information about a volumetric flow of a slurry having minerals and varying amounts of entrained gas flowing in a feed line pipe providing the slurry to a cyclone in a grinding stage of a mineral extraction processing system for extracting a mineral from ore, wherein the first signals are based at least partly on a speed of sound measurement, including a SONAR-based entrained gas measurement to determine the amount of entrained air in conjunction with a density measurement of the slurry flowing in the feed line pipe, and
   second signals containing information about a density measurement of the slurry flowing in the feed line pipe,
   determine corrected second signals to correct errors in the density measurement based upon the varying amounts of entrained gas in the slurry; and
   determine one or more output signals containing information about operations of the grinding stage that is not substantially affected by the varying amounts of entrained gas in the slurry flowing in the feed line pipe based upon the first signals or the corrected second signals, wherein the one or more output signals control a hydrocyclone split that provides a flotation feed from the cyclone to a next stage in the mineral extraction processing system or provides a hydrocyclone split feedback flow from the cyclone to a previous stage in the mineral extraction processing system, including to a mill stage so larger size particles can be re-ground.

2. Apparatus according to claim 1, wherein the apparatus comprises a SONAR-based volumetric flow/gas volume fraction meter placed on the feed line pipe providing the slurry to the cyclone in the grinding stage and configured to provide the first signals.

3. Apparatus according to claim 1, wherein the first signals are also based at least partly on a gas volume measurement that depends on acoustic pressures sensed in the slurry flowing in the pipe.

4. Apparatus according to claim 1, wherein the apparatus comprises a density meter, including a nuclear density meter.

5. Apparatus according to claim 1, wherein the slurry is made up of high solids which contain varying amounts of entrained air.

6. Apparatus according to claim 1, wherein the stage forms part of copper concentrator.

7. Apparatus according to claim 2, wherein the apparatus comprises a the density meter that is also placed on the feed line pipe, responds to the flow of the slurry and provides the second signals with information about the density measurement of the slurry.

8. Apparatus according to claim 1, wherein the cyclone comprises a hydrocyclone that forms part of a hydrocyclone battery.

9. Apparatus according to claim 7, wherein the apparatus comprises a second SONAR-based volumetric flow/gas volume fraction meter that is placed on a flotation feed line pipe providing the slurry from the grinding stage to a flotation stage.

10. Apparatus according to claim 9, wherein the apparatus comprises a second density meter that is also placed on a feed line pipe providing the slurry to the flotation stage.

11. Apparatus according to claim 9, wherein the signal processor module is configured to control the operations based on a substantially exact measured mass flow rate of the ore.

12. Apparatus according to claim 9, wherein the SONAR-based volumetric flow/gas volume fraction meter in configured to make a direct measurement of a mass flow of ore entering the flotation stage.

13. Apparatus according to claim 1, wherein
   the apparatus comprises a second SONAR-based volumetric flow/gas volume fraction meter that is placed on an output line pipe receiving the slurry at the end of the mineral extraction processing system.

14. Apparatus according to claim 13, wherein the apparatus comprises a second density meter that is also placed on the output line pipe providing a density measurement of the slurry.

15. A grinding stage in a mineral extraction processing system for extracting minerals from ore, comprising:
   a SONAR-based volumetric flow/gas volume fraction meter that is placed on a feed line pipe having a slurry with minerals and varying amounts of entrained air flowing therein in relation to a hydrocyclone battery, and configured to respond to the flow of the slurry and provide a signal containing information about a volumetric flow of the slurry that is not substantially affected by the varying amounts of entrained air in the slurry, wherein the signal is based at least partly on a speed of sound measurement, including a SONAR-based entrained gas measurement to determine the amount of entrained air in conjunction with a density measurement of the slurry flowing in the feed line pipe;
a density meter that is placed on the feed line pipe in relation to the SONAR- based volumetric flow/gas volume fraction meter and that is configured to respond to the flow of the slurry and provide a corresponding signal with information about a density measurement of the slurry; and
a signal processor module configured to respond to the signal and the corresponding signal, determine a corrected corresponding signal to correct errors in the density measurement based upon the varying amounts of entrained air in the slurry, and also configured to provide an output signal based upon the signal or the corrected corresponding signal, wherein the output signal contains information to control a hydrocyclone split that provides a flotation feed from the hydrocyclone battery to a next stage in the mineral extraction processing system or provides a hydrocyclone split feedback flow from the hydrocyclone battery to a previous stage in the mineral extraction processing system, including to a mill stage so larger size particles can be re-ground, based upon the signal received.

16. A grinding stage according to claim 15, wherein the grinding stage forms part of a copper concentrator.

17. A method comprising:
receiving with a signal processor module to one or more input signals sensed by a SONAR-based volumetric flow/gas volume fraction (VF/GVF) meter arranged on a feed line pipe and containing information about a volumetric flow of a slurry having minerals and varying amounts of entrained gas flowing in the feed line pipe providing the slurry to a cyclone in a grinding stage of a mineral extraction processing system for extracting a mineral from ore, wherein the one or more input signals are based at least partly on a speed of sound measurement, including a SONAR-based entrained gas measurement to determine the amount of entrained air in conjunction with a density measurement of the slurry flowing in the feed line pipe;
receiving with the signal processor module second signals sensed by a density meter arranged on the feed line pipe in relation to the SONAR-based volumetric flow/gas volume fraction meter and containing information about a density measurement of the slurry;
determining with the signal processor module corrected second signals to correct errors in the density measurement based upon the varying amounts of entrained gas in the slurry; and
determining with the signal processor module output signals containing information about operations of the grinding stage that is not substantially affected by the varying amounts of entrained gas in the slurry flowing in the feed line pipe based upon the one or more input signals or the corrected second signals, wherein the output signals control a hydrocyclone split that provides a flotation feed from the cyclone to a next stage in the mineral extraction processing system or provides a hydrocyclone split feedback flow from the cyclone to a previous stage in the mineral extraction processing system, including to a mill stage so larger size particles can be re-ground.

18. A method according to claim 17, wherein the method comprises placing the SONAR-based volumetric flow/gas volume fraction meter on the feed line pipe providing the slurry to the grinding stage that is configured to provide the first signals.

19. A method according to claim 17, wherein the method comprises placing the density meter that on the feed line pipe.

20. A method according to claim 19, wherein the first signals is also based at least partly on a gas volume measurement that depends on acoustic pressures sensed in the slurry flowing in the feed line pipe.

21. A method according to claim 17, wherein the slurry is made up of high solids which contain varying amounts of entrained air.

22. Apparatus comprising:
a signal processor module configured to receive a first signal from a SONAR-based volumetric flow/gas volume fraction (VF/GVF) meter containing information about a volumetric flow of a slurry having minerals and varying amounts of entrained gas flowing in a feed line pipe providing the slurry to a cyclone in a grinding stage of a mineral extraction process, wherein the first signal is based at least partly on a speed of sound measurement, including a SONAR-based entrained gas measurement to determine the amount of entrained air in conjunction with a density measurement of the slurry flowing in the feed line pipe, and receive a second signal containing information about a density measurement of the slurry, configured to determine a corrected second signal to correct errors in the density measurement based upon the varying amounts of entrained gas in the slurry, and also configured to provide a control signal containing information about operations of the grinding stage of the mineral extraction process that is not substantially affected by the varying amounts of entrained gas in the slurry flowing in the feed line pipe based upon the first signal or the corrected second signal; and
a hydrocyclone split configured to receive[d to] the control signal in order to provide a flotation feed from the cyclone to a next stage in the mineral extraction process or provide a hydrocyclone split feedback flow from the cyclone to a previous stage in the mineral extraction processing system, including to a mill stage so larger size particles can be re-ground, based upon the control signal received.

23. A grinding stage according to claim 15, wherein the grinding stage comprises the hydrocyclone split.

24. Apparatus according to claim 22, wherein the apparatus comprises a SONAR-based volumetric flow/gas volume fraction meter arranged on the feed line pipe and configured to provide the first signals.

25. Apparatus according to claim 24, wherein the apparatus comprises a density meter arranged on the feed line pipe in relation to the SONAR-based volumetric flow/gas volume fraction meter and configured to provide the second signals.

26. Apparatus according to claim 14, wherein the one or more output signals provide information about a final product accounting related to the processing stage of the mineral extraction processing system for extracting the mineral from ore.

* * * * *